United States Patent [19]
Grossberg

[11] 3,747,263
[45] July 24, 1973

[54] PINWHEEL
[75] Inventor: Sam Grossberg, Brooklyn, N.Y.
[73] Assignee: Friedman and Goodman, Brooklyn, N.Y.
[22] Filed: May 15, 1972
[21] Appl. No.: 253,185

[52] U.S. Cl............................................. 46/58, 40/39
[51] Int. Cl............................................. A63h 33/40
[58] Field of Search............................ 46/47, 58, 51; 40/39

[56] References Cited
UNITED STATES PATENTS
1,669,748 5/1928 Greger.................................... 46/58
2,510,336 6/1950 Donahue................................ 46/58
3,221,440 12/1965 Gutierez................................ 46/58
2,985,976 5/1961 Parker.................................... 40/39

Primary Examiner—F. Barry Shay
Assistant Examiner—Robert F. Cutting
Attorney—Abraham Friedman, Abraham Goodman et al.

[57] ABSTRACT

A pinwheel comprising a plurality of flexible blade members rotatably journaled on a shaft and constrained relative to one another in arcuate relation such that each of the blades are interleaved adjacent one another and present an array of generally spherical appearance.

9 Claims, 7 Drawing Figures

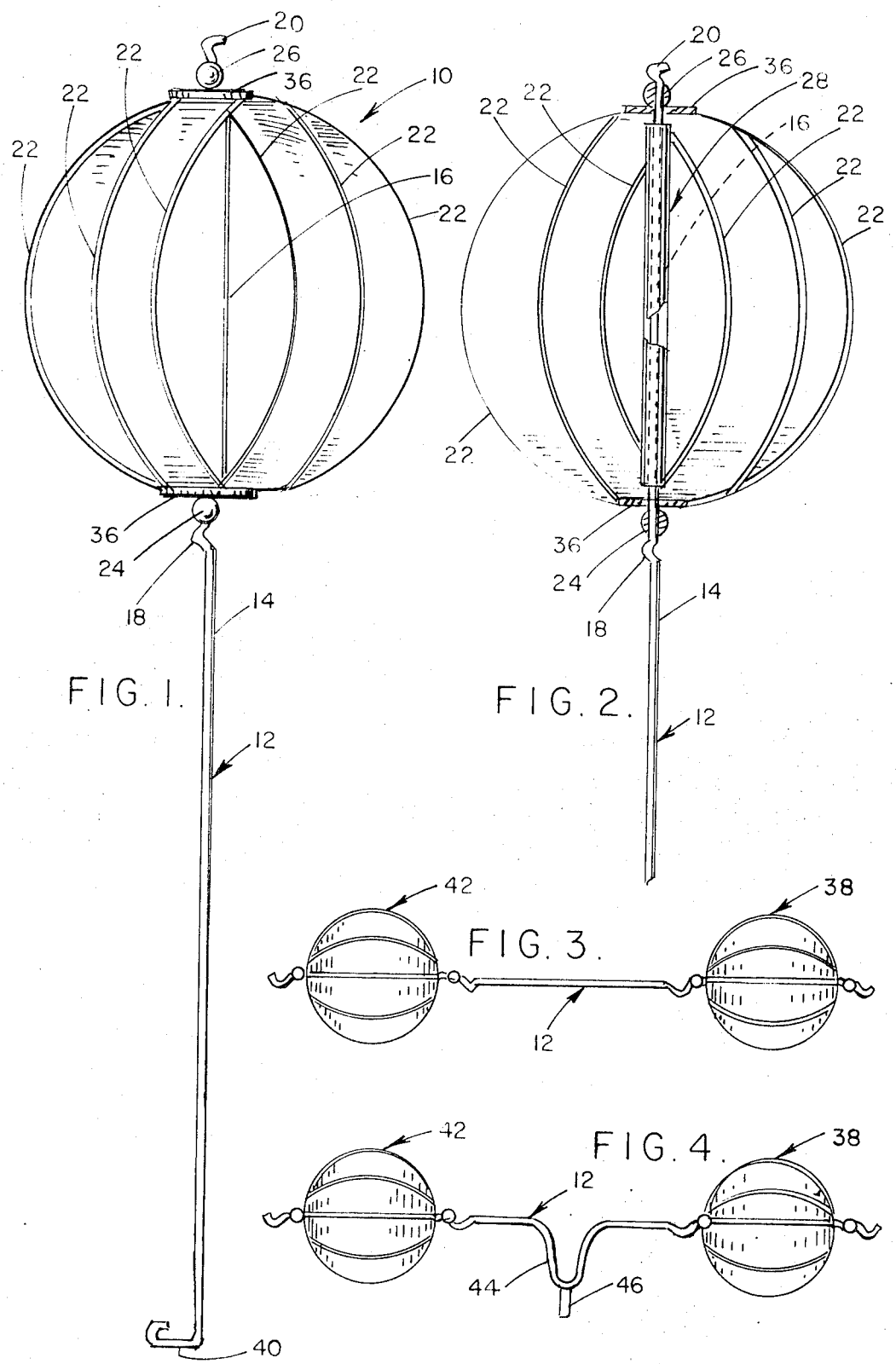

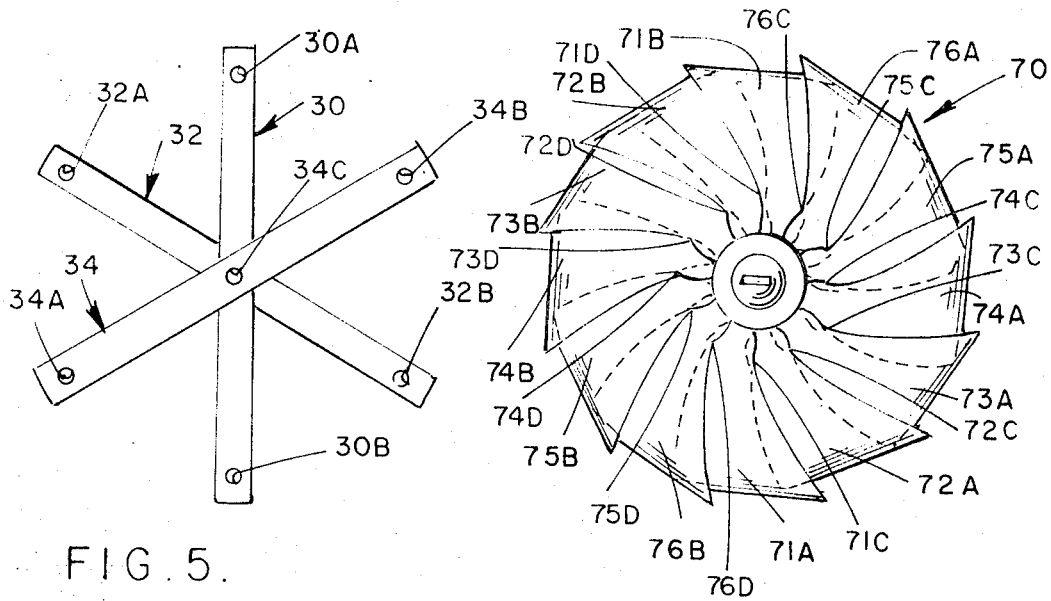
FIG. 5.
FIG. 6.
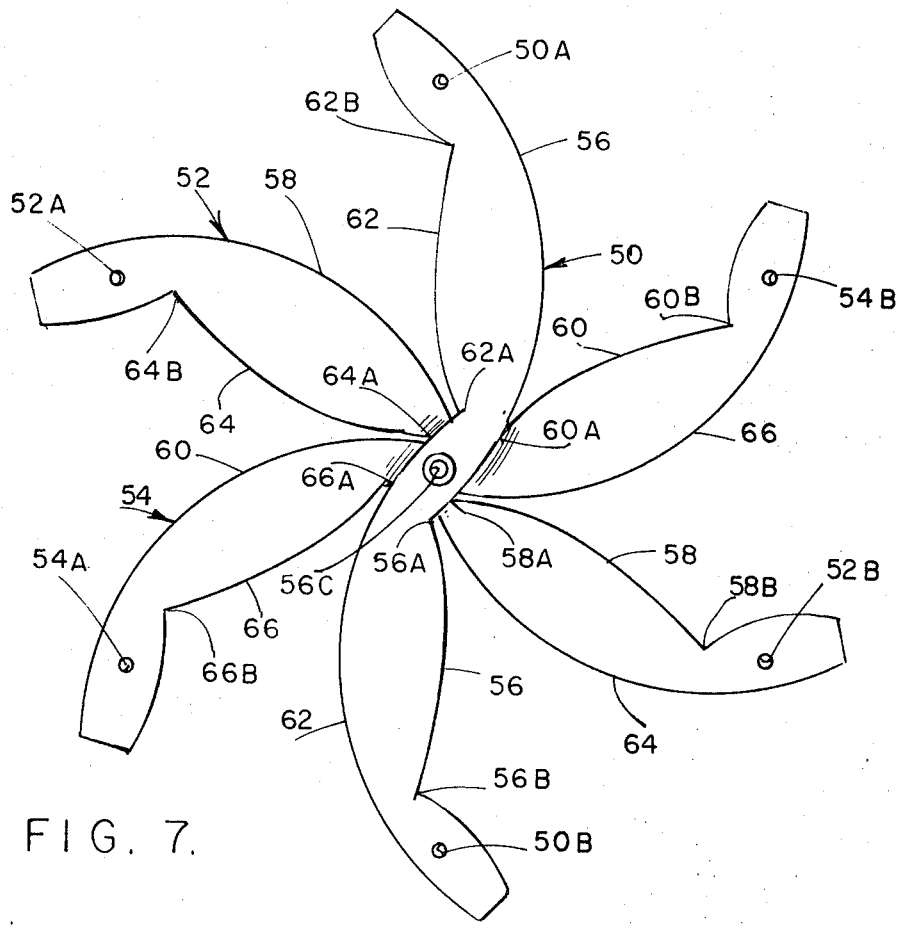
FIG. 7.

PINWHEEL

BACKGROUND OF THE INVENTION

The present invention relates generally to toys and the like, and more particularly to a pinwheel having a plurality of interleaved blades which arcuately extend relative to one another so as to present a spherical appearance.

The conventional pinwheel generally employs a shaft upon which are rotatably mounted a plurality of blades which are pitched relative to one another so as to be rotated relative to the shaft upon being subjected to a wind load. However, the blades are pitched relative to one another in a generally planar-like uni-directional array and, therefore, will not most effectively rotate when subjected to a wind load moving in a direction generally transversely of the uni-directional relationship of the blades. Thus, the conventional type of pinwheel has what may be characterized as a preferred orientation relative to the wind load and must be so adjusted by a child or other user so as to permit the array of blade members to most effectively rotate relative to the shaft upon which the blades are journaled.

In other words, a wind load in a direction generally parallel to the planar-like relationship of the pitched blades will be less effective for rotating the array of blades than that wind load which moves generally in a direction transversely of the planar-like relationship of the pitched blades.

SUMMARY OF THE INVENTION

Accordingly, it is an object of the present invention to provide a pinwheel which need not be adjusted relative to various wind directions, but which is provided with a generally spherical array of blade members which are interleaved relative to one another, such that no matter what orientation the spherical blade members have with regard to a particular wind direction, the blade members will most effectively and rapidly rotate relative to a shaft upon which the blade members are journaled freely.

It is a further object of the present invention to provide a pinwheel which is so constructed that it can be made attractively pleasing to both children and adults alike and can be handled by children in a manner which will most effectively withstand rough usage dispite the rather light-weight construction thereof.

To this end, the present invention relates generally to a pinwheel having a plurality of flexible blade members which are interleaved relative to one another such that they present an array of generally spherical appearance, which array is journaled freely upon a shaft or the like.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 1 is a vertical elevational view of one embodiment pursuant to the present invention;

FIG. 2 is a vertical partially cross-sectional view taken along the shaft axis and illustrating the manner by which the blades are constrained so as to present a spherical appearance;

FIG. 3 is an alternate embodiment of the present invention;

FIG. 4 is still a further alternate embodiment of the present invention;

FIG. 5 is a top plan view of the association of blades with one another at an intermediary stage of assembling the blades, pursuant to the embodiments illustrated in FIGS. 1 and 2;

FIG. 6 is a top plan view of the preferred embodiment of the present invention; and FIG. 7 is a view similar to that of FIG. 5 illustrating the configuration of each of the blades and the manner by which the blades are to be associated with one another at an intermediate stage of assembling the blades into the spherical appearance illustrated in FIG. 6.

DETAILED DESCRIPTION OF THE INVENTION

Referring now to the drawings, and more particularly to FIGS. 1 and 2 thereof, the present invention relates generally to a pinwheel denoted by the reference character 10. The pinwheel 10 includes a substantially rigid metallic wire shaft 12 having a handle portion 14 and a blade member carring portion 16 separated from one another through the intermediary of a lower crimp 18, the blade member carrying portion 16 terminating at one end thereof in a crimp 20.

Freely journaled, upon the blade member carrying portion 16, are a plurality of blade members 22 which are adapted to rotatably move relative to the shaft 12 and are constrained thereon in a manner as will be further clarified below. The blade members 22 are arranged in a spherical array and rest freely upon a lower bead 24, and are constrained generally in spherical relation by means of an upper or end bead 26 and by an elongate plastic tube 28, the tube 28 illustrated generally in FIG. 2. The length of the tube 28 is such so as to prevent the diametral end portions of the array of blade members 22 from being squeezed toward one another between the beads 24 and 26, in a manner which may otherwise or irreparably damage the blade members 22. The blades 22 are constituted preferably of resilient thin gage plastic and arranged successively adjacent one another so as to be interleaved relative to one another in a manner which most effectively permits rotation thereof relative to the shaft 12 when subjected to a wind load in any direction.

The manner by which the blades 22 illustrated in FIGS. 1 and 2 are to be journaled upon the shaft 12 is generally schematically illustrated in FIG. 5. In this respect, the blade members are denoted by the reference characters 30, 32 and 34 respectively, each being generally of rectangular contour. The blade 30 is provided with a pair of opposite end portions, each of which is provided with an aperture 30A and 30B respectively, reference characters 32A and 32B denoting apertures in the end portions of the blade member 32, and reference characters 34A and 34B respectively denoting apertures in the end portions of the blade 34. Similarly, each of the blades 30, 32 and 34, are provided with a central portion which is apertured, reference character 34C denoting the aperture in the top-most blade 34 at the central portion thereof.

The blades 30, 32 and 34 respectively are to be arranged such that each of the central apertures thereof are coaxially arranged in superposed relation in a manner illustrated in FIG. 5 and by means of a staple 36 denoted in FIGS. 1 and 2, the central apertured portions of each of the blades 30, 32 and 34 respectively can be retained in fixed coaxial superposed relation with one another. Thereafter, the apertured end portions 30A and 30B of the blade member 30, the apertured end portions 32A and 32B of the blade member 32, and the apertured end portions 34A and 34B of the blade member 34, are all brought upwardly from the plane of FIG. 5 such that each of these apertured end portions aforementioned are coaxially superposed upon one another and secured relative to one another such as by means of a staple or the like. The resultant array is of generally spherical appearance in a manner generally illustrated in FIGS. 1 and 2, each of the blades forming a respective circular-like configuration.

Although only three blades 30, 32 and 34 respectively are illustrated in FIG. 5, in fact, it is preferred that at least six blades be arranged in successively superposed relation in a manner illustrated in FIG. 5 for the three blades 30, 32 and 34 respectively and when secured such as by staples at each of the apertured portions thereof into a spherical array, the blade members are to be arranged such that each is interleaved relative to the neighboring blades adjacent thereto, thus presenting a universally directed pitch for being subjected to wind loads in any direction.

The pitch of each of the blades relative to one another and relative to the shaft 12 can be achieved such as by means as will be described below for the preferred embodiment illustrated in FIGS. 6 and 7.

Pursuant to the embodiment illustrated in FIG. 1, the shaft 12 may terminate in a transverse end 40 which can be held in the fingers of the child and permit the child to swing the shaft 12 about the transverse end 40, the latter acting as a pivot for the shaft 12 so as to thereby swing the spherical array of blades and cause rotation thereof in the absence of wind velocity, wind velocity in effect being generated by rotation of the shaft 12 about the axis of the transverse end 40.

Still other or alternate embodiments are illustrated in FIGS. 3 and 4 respectively wherein a pair of spherically arranged blades are rotatably journaled upon opposite end portons of the shaft 12, the shaft 12 including appropriate crimps and beads thereon in a manner described above for the embodiment illustrated in FIGS. 1 and 2, the spherical appearing arrays being denoted by the reference characters 38 and 42 respectively and imparting to the assembly a baton-like unit. The difference between the embodiments of FIGS. 3 and 4 is that in FIG. 3 the shaft 12 at the center thereof is generally straight, whereas the shaft 12 in the embodiment illustrated in FIG. 4 is provided with a central bend 44 from which extends a transverse handle 46 for being grasped by the child and acting as an axis about which the shaft 12 can be rotated for permitting the spherically arranged blades denoted by reference characters 38 and 42 to be subjected to wind load even in the absence of a substantial wind load.

Referring now to FIGS. 6 and 7, the preferred embodiment of the present invention is to be arranged generally in a manner as illustrated in FIGS. 1 and 2 and described above for the aforementioned embodiment, the difference relating generally to the manner by which the pitch of each of the blades is to be effected relative to one another.

In this respect, as illustrated in FIG. 7, three blades, denoted by reference characters 50, 52 and 54 respectively, are provided, each having a generally S-shaped configuration. Each of the blades is provided with opposite end portions having respective apertures therein, such as the apertures 50A and 50B in the end portions of the blade member 50, apertures 52A and 52B in the end portions of the blade member 52, and apertures 54A and 54B in the end portions of the blade member 54. Moreover, each of the blades 50, 52 and 54 respectively is provided with a transition portion in which is disposed an aperture, such as aperture 50C in FIG. 7.

Each of the blade members is, likewise, provided with a pair of opposing edges each of which commonly terminates at the opposite end portions of the blade members, reference characters 56 and 62 denoting the opposing edges for that of the blade member 50, reference characters 58 and 64 denoting the opposite edges of the blade member 52, and reference characters 60 and 66 denoting the opposite edges of the blade member 54.

For purposes, as will be further described below, of constraining each of the blades 50, 52 and 54 respectively relative to one another so as to have a preferred pitch, each of the edges of each of the blades is to be provided with a pair of spaced indentations. In this respect, edge 56 of the blade member 50 is provided with indentations 56A and 56B respectively, indentation 56A being disposed adjacent the medial or transition portion thereof, whereas indentation 56B is disposed adjacent one end portion thereof. Similarly, edge 62 of the blade member 50 is provided with a pair of spaced indentations, indentation 62A being disposed adjacent the transition or medial portion thereof, whereas indentation 62B is disposed adjacent the opposite end portion of blade 50 from that end portion at which the indentation 56b is disposed.

Each and every one of the blades 50, 52 and 54, are generally identical with one another in size and configuration, and thus, as described above for the blade 50, blades 52 and 54 are likewise provided with spaced indentations. In this respect, edge 58 of the blade member 52 is provided with one indentation 58A adjacent the transition portion thereof, and indentation 58B adjacent one end portion thereof. On the other hand, edge 64 of the blade member 52 is provided with indentation 64A adjacent the transition portion thereof and indentation 64B adjacent the opposite end poriton thereof. Likewise, edge 60 of the blade member 54 is provided with indentation 60A adjacent the transition portion thereof, and indentation 60B adjacent one end portion thereof. On the other hand, edge 66 of the blade member 54 is provided with indentation 66A adjacent the transition portion thereof, and indentation 66B at the opposite end portion thereof.

The blades 50, 52 and 54, are to be arranged or superposed upon one another in a manner illustrated in FIG. 7 such that the aperture in the transition portion of each of the blade members is coaxially aligned with the others, the transition portions of each of the blade members being superposed as a group upon one another. Because of the relationship of each of the indentations described above, when the blade members 50, 52 and 54 are superposed upon one another in a manner illustrated in FIG. 7, respective portions of each of the edges of each of the blade members may effectively be constrained or seated within the spaced indentations of an adjoining edge of a neighboring blade. In this respect, the edge 56 at one portion thereof can be partially confined within the indentation 60A of the blade 54, the edge 66 of the blade 54 can be constrained within the indentation 58A of the blade 52, the edge 64 of the blade 52 can be constrained within the indentation 56A of the blade 50, the edge 62 of the blade 50 can be constrained within the indentation 66A of the blade 54, the edge 60 of the blade 54 can be constrained within the indentation 64A of the blade 52, and the edge 58 of the blade 52 can be constrained within the indentation 62A of the blade member 50.

Similarly, upon bending each of the blades 50, 52 and 54 upwardly of the plane of FIG. 7, in a manner described above for that of FIG. 5, such that the apertures 50A and 50B of the blade member 50, the apertures 52A and 52B of the blade member 52, and the apertures 54A and 54B of the blade member 54 are all coaxially superposed upon one another as a group in coaxial relation opposite the coaxially aligned transition portion apertures at the center of each of the blades, and secured to one another such as by means of a staple or the like, the opposite edges of each of these blades can be constrained within the indentations at the end portions of the neighboring blades.

In this respect, when the end portions of each of the blades are so secured to one another, the end edge 56 of the blade 50 can be partially constrained within the indentation 60B of the blade 54, the end edge 66 of the blade 54 can be constrained within the indentation 58B of the blade 52, the end edge 64 can be constrained within the indentation 56B of the blade member 50, the end edge 62 can be constrained within the indentation 66B of the blade 54, the end edge 54 can be constrained within the indentation 64B of the blade 52, and the end edge 58 can be constrained within the indentation 62B of the blade member 50.

With the blades 50, 52 and 54, secured to one another such as by staples or the like, such that the superposed group of end portion apertures are coaxially opposite the superposed group of transition portion apertures, and such that each of the opposite edges of the blades are constrained within the adjacent indentations of the neighboring blades, the blades as so arranged, will present a generally spherical appearance wherein each of the blades are interleaved relative to one another and present a generally fixed pitch of universal extent so as to be rotated relative to a shaft, such as that of the shaft 12 illustrated in FIG. 1 when subjected to a wind load in any direction, each of the blades forming a respective circular-like configuration.

Although only three blades are illustrated for the embodiment illustrated in FIG. 7, it is preferred that the arrangements have aptly six blades in a manner illustrated in FIG. 6 to provide a densely populated spherical array 70 of 12 half segments such as denoted by reference characters 71 A and B – 76 A and B, the latter including respective indentations, 71C and D – 76C and D, in a manner illustrated in FIG. 7 at the end portions thereof and at the transition portions thereof (not shown).

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A pinwheel comprising a plurality of discreet flexible blade members, each of said blade members being, in plan development, S-shaped, said blade members each including a pair of opposite apertured end portions, an apertured transition portion between said end portions, and a pair of opposing edges commonly terminating at said end portions, said blade members having their transition portions superposed with all the apertures of said transition portions being coaxially aligned, said blade members being arcuately disposed and having said end portions superposed on the same side of said superposed transition portions, said apertures of said end portions being in coaxial alignment with said transition portion apertures; shaft means extending freely through the apertures of said end portions and of said transition portions of each of said blade members, said shaft means including securing means for maintaining said blade members in arcuate configuration, said blade members being successively angularly arranged about said shaft means in interleaved relation; and spacer means mounted on said shaft means and extending between said end and transition portions for preventing movement of said end and transition portions towards one another while disposed in said arcuate configurations, whereby said blade members cooperatively form an interleaved array of generally spherical appearance.

2. A pinwheel as claimed in claim 1, wherein each of the opposing edges of each of said blade members includes a pair of spaced indentations, one indentation of each pair being disposed at each of said end portions, the other indentation of each pair being disposed at said transition portion, said blade members extending in successive partial abutting relation with one another such that respective spaced portions of one edge of each of said blade members, which have absent therefrom indentations, engageably seat within the pair of indentations respectively provided in the edge portion of an adjacent blade member.

3. A pinwheel as claimed in claim 1, wherein said spacer means includes a cylindrical member interposed between the group of superposed end portions and the group of superposed transition portions.

4. A pinwheel as claimed in claim 3, wherein said securing means comprises crimp means for maintaining the group of superposed end portions proximate one end of said cylindrical member and the group of superposed transition portions proximate an opposite end of said cylindrical member.

5. A pinwheel as claimed in claim 4, wherein said crimp means divides said shaft means into a handle portion and a blade member carrying portion each of which extend generally parallel to one another.

6. A pinwheel as claimed in claim 5, wherein said spacer means includes a generally spherical bead journaled freely on said shaft means and interposed between one crimp and said blade members, and a further generally spherical bead journaled freely at a crimped end of said shaft means between the latter said end and said blade members.

7. A pinwheel as claimed in claim 6, wherein said handle portion of said shaft means terminates at a bent opposite end portion extending generally transversely of the remainder of said handle portion.

8. A pinwheel as claimed in claim 1, including a further spherical array of blade members similar to the first said array and journaled freely upon said shaft means in spaced relation with the first said array.

9. A pinwheel as claimed in claim 8, including a transverse handle projecting from said shaft means between said spherical arrays of blade members.

* * * * *